United States Patent
Thozhuvanoor

(10) Patent No.: US 9,800,408 B2
(45) Date of Patent: Oct. 24, 2017

(54) METHOD OF GENERATING SECURE TOKENS AND TRANSMISSION BASED ON (TRNG) GENERATED TOKENS AND SPLIT INTO SHARES AND THE SYSTEM THEREOF

(71) Applicant: Integrita Computing Systems India Private Limited, Hyderabad (IN)

(72) Inventor: Vellat Lakshmi Thozhuvanoor, Secunderabad (IN)

(73) Assignee: UNIK SYSTEMS DESIGN & MARKETING PVT LTD, Hyderabad (IN)

(*) Notice: Subject to any disclaimer, the term of this patent is extended or adjusted under 35 U.S.C. 154(b) by 0 days.

(21) Appl. No.: 14/359,588

(22) PCT Filed: Nov. 30, 2012

(86) PCT No.: PCT/IN2012/000781
§ 371 (c)(1),
(2) Date: May 21, 2014

(87) PCT Pub. No.: WO2013/080224
PCT Pub. Date: Jun. 6, 2013

(65) Prior Publication Data
US 2014/0341374 A1 Nov. 20, 2014

(30) Foreign Application Priority Data
Dec. 11, 2011 (IN) .......................... 4175/CHE/2011

(51) Int. Cl.
*H04L 9/00* (2006.01)
*H04L 9/08* (2006.01)
(Continued)

(52) U.S. Cl.
CPC ........ *H04L 9/0869* (2013.01); *G06K 9/00577* (2013.01); *G09C 5/00* (2013.01);
(Continued)

(58) Field of Classification Search
CPC ... H04L 9/0869; H04L 9/085; G06K 9/00577; G06K 2009/0059; G09C 5/00; G06Q 30/0185; H04N 1/32149; G06F 7/58
See application file for complete search history.

(56) References Cited

U.S. PATENT DOCUMENTS

| | | | |
|---|---|---|---|
| 2010/0165348 A1* | 7/2010 | Fleischer | G01N 21/41 356/458 |
| 2013/0124606 A1* | 5/2013 | Carpenter | H04L 67/06 709/203 |

FOREIGN PATENT DOCUMENTS

| | | | | |
|---|---|---|---|---|
| EP | 0260815 A1 | 3/1988 | | |
| EP | 2306692 B1 * | 5/2014 | | H04M 1/7253 |
| WO | 9636163 A2 | 11/1996 | | |
| WO | WO9636163 A2 * | 11/1996 | | |

OTHER PUBLICATIONS

Moni Naor et al: "Visual cryptography", May 9, 1994 (1994-85-89), Advances in Cryptology Eurocrypt '94 Springer Berlin Heidelberg, Berlin, Heidelberg, pp. 1-12.*
Berk Sunar ("State of the Art in True Random Number Generation" Dec. 11, 2006 Xp055062233.*
Naor et al., "Visual Cryptography," May 9, 1994, Advances in Cryptology Eurocrypt '94, pp. 1-12.
Walton, "Image Authentication for a Slippery New Age," 1995, Dr. Dobb's Journal.

* cited by examiner

*Primary Examiner* — Mohammed Waliullah
(74) *Attorney, Agent, or Firm* — William J. Clemens; Shumaker, Loop & Kendrick, LLP

(57) ABSTRACT

A method of and system for generating secure tokens and transmission based on (TRNG) generated tokens split into shares includes steps of: generating keys by a hardware
(Continued)

based True Random number Generator (TRNG); sieving/filtering the generated keys using statistical tests suite; selecting the random numbers of required width as tokens; applying number to image transformation for the tokens; applying steganography methods of injecting into an image carrier to the selected tokens; and splitting the steganographic contents into at least two shares using Share Generation Appliance (SGA), which is based on visual cryptographic methods. The generated secure tokens are well suited for seamless secured shopping including product verification.

35 Claims, 3 Drawing Sheets

(51) Int. Cl.
    *G06K 9/00*     (2006.01)
    *G09C 5/00*     (2006.01)
    G06F 7/58     (2006.01)
    G06Q 30/00     (2012.01)
    H04N 1/32     (2006.01)

(52) U.S. Cl.
    CPC ................ H04L 9/085 (2013.01); *G06F 7/58* (2013.01); *G06K 2009/0059* (2013.01); *G06Q 30/0185* (2013.01); *H04N 1/32149* (2013.01)

METHOD OF GENERATING SECURE TOKENS AND TRANSMISSION BASED ON (TRNG) GENERATED TOKENS AND SPLIT INTO SHARES AND THE SYSTEM THEREOF

The present application has a reference to a co-pending Indian patent application number 4175/CHE/2011 of Dec. 1, 2011 entitled "A METHOD OF GENERATING SECURE TOKENS AND TRANSMISSION BASED ON (TRNG) GENERATED TOKENS AND SPLIT INTO SHARES AND THE SYSTEM THEREOF". In order to further elucidate the disclosed methods as presently claimed we hereby incorporate by reference the said co-pending patent application filed by the same applicants as the present patent application includes under "Detailed Description" a section describing in high level of detail how the preferred secure tokens and transmission based on (TRNG) generated tokens are split into shares and vice versa which is well suited for the application it is used for, i.e., for purposes of seamless secured shopping including product verification and other secured access to hardware's/media etc. It is, however, obvious that such a scheme could be usable within a much more broad-based context as well as being very similar to the methods as herein described.

FIELD OF INVENTION

The subject disclosure relates to components and systems for generating cryptographic tokens (keys) generated out of hardware based True Random Number Generator (TRNG), Statistical tests to weed out weak keys, number-to-image transformation followed by new steganographic methods of injecting into an Image carrier and splitting into shares using Visual Cryptographic methods. More particularly the present invention relates to an improved token shares creation and a storage process which is significantly better than PKI, wherein the share keys are in an image form. Further embodiments disclose applications of disclosed system and method with enhanced security and integrity.

BACKGROUND ART

In the prior art, a PCT publication WO9636163 discloses steganography systems. The improvements include facilitating scale and rotation registration for steganographic decoding by use of rotationally symmetric steganographically embedded patterns and subliminal digital graticules; improved techniques for decoding without access to unencoded originals; improving robustness of steganographic coding in motion pictures and/or in the presence of lossy compression/decompression; and representing data by patterned bit cells whose energy in the spatial domain facilitates decoding registration. Applications include enhanced-security financial transactions, counterfeit resistant identification cards, fraud deterrent systems for cellular telephony, covert modem channels in video transmission, photo duplication kiosks with automatic copyright detection, and hot linked image objects (e.g. with embedded URLs) for use on the Internet.

It is further known to encrypt an image in order to prevent the image being recognized or to prevent its contents being read by unauthorized persons. One technique of encrypting an image is disclosed in, for example, European Patent Application EP 0 260 815. This technique, also known as visual cryptography, employs two patterns or "shares", each of which cannot be recognized individually, which are overlaid to produce a recognizable image. To this end, the original image is transformed into two randomized image patterns, neither of which contains any perceptible image information. One of these patterns is printed on a transparency to act as a key. When such patterns are overlaid, the patterns are combined and thus "decrypted" in the eye of the viewer.

Rather than working with transparencies which are cumbersome when larger amounts of individually encrypted images are to be viewed, it has been proposed to use a decrypting (decryption) device. Two types of image decrypting devices can be distinguished: transparent and non-transparent devices. Transparent decrypting devices essentially mimic the transparent sheets used in the Prior Art and display one pattern ("share") of the encrypted image. As the decrypting device is at least partially transparent, the other pattern of the image can be seen through the device and the two image patterns are combined in the eye of the viewer as before.

Further in the prior art steganographic methods currently known generally involve fully deterministic or "exact" prescriptions for passing a message. Another way to say this is that it is a basic assumption that for a given message to be passed correctly in its entirety, the receiver of the information needs to receive the exact digital data file sent by the sender, tolerating no bit errors or "loss" of data. By definition, "lossy" compression and decompression on empirical signals defeat such steganographic methods. (Prior art, such as the previously noted Komatsu work, are the exceptions here.)

The principles of this technology can also be utilized as an exact form of steganography proper. It is suggested that such exact forms of steganography, whether those of prior art or those of this technology, be combined with the relatively recent art of the "digital signature" and/or the DSS (digital signature standard) in such a way that a receiver of a given empirical data file can first verify that not one single bit of information has been altered in the received file, and thus verify that the contained exact steganographic message has not been altered. The simplest way to use the principles of this technology in an exact steganographic system is to utilize the previously discussed "designed" master noise scheme wherein the master snowy code is not allowed to contain zeros. Both a sender and a receiver of information would need access to both the master snowy code signal and the original unencoded original signal. The receiver of the encoded signal merely subtracts the original signal giving the difference signal and the techniques of simple polarity checking between the difference signal and the master snowy code signal, data sample to data sample, producing a the passed message a single bit at a time. Presumably data samples with values near the "rails" of the grey value range would be skipped (such as the values 0, 1, 254 and 255 in 8-bit depth empirical data).

The need for the receiver of a steganographic embedded data file to have access to the original signal can be removed by turning to what the inventor refers to as "statistical steganography." In this approach, the methods of this technology are applied as simple a priori rules governing the reading of an empirical data set searching for an embedded message. This method also could make good use of it combination with prior art methods of verifying the integrity of a data file, such as with the DSS. (See, e.g., Walton, "Image Authentication for a Slippery New Age," Dr. Dobb's Journal, April, 1995, p. 18 for methods of verifying the sample-by-sample, bit-by-bit, integrity of a digital image.)

Statistical steganography posits that a sender and receiver both have access to the same mastersnowy code signal. This signal can be entirely random and securely transmitted to both parties, or generated by a shared and securely transmitted lower order key which generates a larger quasi-random master snowy code signal. It is a priori defined that 16 bit chunks of a message will be passed within contiguous 1024 sample blocks of empirical data, and that the receiver will use dot product decoding methods as outlined in this disclosure. The sender of the information pre-checks that the dot product approach indeed produces the accurate 16 bit values (that is, the sender pre-checks that the cross-talk between the carrier image and the message signal is not such that the dot product operation will produce an unwanted inversion of any of the 16 bits). Some fixed numbers of 1024 sample blocks are transmitted and the same number times 16 bits of message is therefore transmitted. DSS techniques can be used to verify the integrity of a message when the transmitted data is known to only exist in digital form, whereas internal checksum and error correcting codes can be transmitted in situations where the data may be subject to change and transformation in its transmission. In this latter case, it is best to have longer blocks of samples for any given message content size (such as 10K samples for a 16 bit message chunk, purely as an example).

The images used for synchronization purposes may show an identification token, such as a number, letter or name, to allow an easy recognition of the correctly decrypted image. This token could identify a key on the display device which could be pressed to identify the correctly decrypted image.

Although various ways of receiving user input can be envisaged, it is preferred that the display device receives the user indication via a pointing device and/or a keyboard. A suitable pointing device is a so-called mouse, although other pointing devices, such as a "track ball" or a "touch-pad mouse" can also be used. The term "keyboard" as used here is meant to include other key arrangements, such as keypads. Alternatively, the use of touch-screen technology may be advantageous.

The images used for synchronization according to the present invention may be monochrome images or color images although various techniques may be used for rendering color images in visual cryptography and similar applications.

At present, all QR codes generated and used by manufacturers are basic in nature and contain basic data such as URL codes or product information. Security is a big concern with QR codes at the moment. The biggest worry is that consumers scanning QR codes can easily be hijacked into malicious web sites, instead of original, intended web sites of manufacturers. The QR codes at present can't be used for shopping, buying or authentication purposes.

SUMMARY OF INVENTION

The present invention therefore provides a system for secured shopping, configured with a mobile application using cryptographic tokens (keys) generated out of hardware based True Random Number Generator (TRNG), number-to-image transformation followed by new steganographic methods of injecting into an Image carrier and splitting into shares using Visual Cryptographic methods. For every key generated, a pair of share tokens is generated.

In addition the present invention also provides a method for seamless secured shopping experience to consumers using their mobile phones, whether they are shopping in-store, online, on TV or outdoor using the disclosed mobile application configured for scanning the QR (quick reader) code printed on the labels and transmitting it to a server dedicated for product verification for its genuineness and further purchase of the product.

As per an exemplary embodiment of the present invention, the present disclosure is also intended for helping the product manufacturer fight fake/pirated goods problem by online/real time verification of product using the configured mobile application. This would help customers to avoid fake goods at the time of purchase itself. The manufacturer would come to know of the fake goods incidence in real time, and can take action accordingly.

As per another embodiment of the present invention, the solution would help manufacturers to improve their customer relationship management and inventory/sales management. Using the disclosed mobile application, consumers can immediately register their product with the manufacturer in real time. The manufacturer would also come to know about sales in real time and therefore can plan their production and distribution effectively, resulting in cost savings and improved business. In addition the manufacturers can also enhance their sales by converting Out Of Home advertisements and TV advertisements into sales. At present, there is direct way of converting impulses created by OOH or TV ads. Consumers can use the QR codes printed on these ads to immediately purchase goods.

As per yet another embodiment of the present invention, the solution would help retailers to cut costs and improve shopping experience. Since the disclosed application facilitates "Pay As You Shop" and easy, self-checkouts, consumers can avoid queues and shop more. Retailers would also avoid installing expensive automated checkout machines or cashiers.

The use of the QR codes, which are increasingly printed on various goods labels and in adverts all over the world for proving the authenticity and genuineness is a very old method but the use of the QR codes by means of shares using the disclosed method enhances the security in many folds and there is absolutely no chance of any mischief, piracy, and cannot be hijacked into malicious web sites. All the objectives mentioned above fit easily with services as well. Consumers can buy tickets and make utility payments using the disclosed solution.

Therefore such as herein described there is disclosed a method of generating secure tokens and transmission based on (TRNG) generated tokens and split into shares, the method comprising steps of: generating the keys by a hardware based True Random number Generator (TRNG); sieving/filtering the generated keys using statistical tests suite and are orthogonal amongst the created; selecting the random numbers of required width as tokens; applying number to image transformation for the said tokens; applying steganography methods of injecting into image carrier to the selected tokens; and splitting the steganographic contents into at least two shares using Share Generation Appliance (SGA), which is based on visual cryptographic methods.

Further disclosed is a system for generating secure tokens and transmission based on (TRNG) generated tokens and split into shares, the system comprising of: means for generating the keys by a hardware based True Random number Generator (TRNG); means for sieving/filtering the generated keys using statistical tests suite; means for selecting the random numbers of required width as tokens;

means for applying number to image transformation for the said tokens;

means for applying steganography methods of injecting into a image carrier to the selected, tokens; and means for splitting the steganographic contents into at least two shares using visual cryptographic methods.

As per another object of the present invention there is provided a method for generating secure tokens and transmission based on True random number generator (TRNG) using image transformation, steganography and Visual cryptographic algorithms.

For every key generated a pair of share tokens is generated. The system comprising: means for generating the keys by a hardware based True Random number Generator (TRNG); means for sieving/filtering the generated keys using statistical tests suite; means for selecting the random numbers of required width as tokens; means for applying number to image transformation for the said tokens; means for applying steganography methods of injecting into a image carrier to the selected tokens; and means for splitting the steganographic contents into at least two shares using visual cryptographic methods.

Also it is an object of the present invention to provide share keys which are in an image form, unlike the regular ASCII form as is the case with most existing key solutions. This results in enhanced security and integrity.

Further object of the present invention is to provide a cryptographic method which is easier to implement. The implementation disclosed herein is completely at the user control. No third party or vendor required for continuous usage of this solution.

As per an exemplary embodiment of the present invention is to provide random number sanctity. A True Random Number Generator is used to generate the base random numbers (which are further converted into image and then shares in situ using our KGA) which are true numbers in nature, unlike pseudo random numbers. The disclosed TRNG and KGA together could produce significantly large number of orthogonally different keys (0.5 million every 15 minutes), which is significantly better compared to alternatives such as PKI.

A system of this kind allows a quick and convenient synchronization.

Still further object of the present invention is to provide a cryptographic and decryptographic method wherein the whole process is done programmatically and no human intervention for decision is needed.

Another exemplary embodiment includes different applications of the disclosed method and system in the fields of shopping, banking, secured hardware transactions etc.

BRIEF DESCRIPTION OF THE ACCOMPANYING DRAWINGS

The present invention will further be explained below with reference to exemplary embodiments illustrated in the accompanying drawings, in which:

FIG. 1 schematically shows token shares creation and storage process according to the present invention;

DETAILED DESCRIPTION

Figure 1:
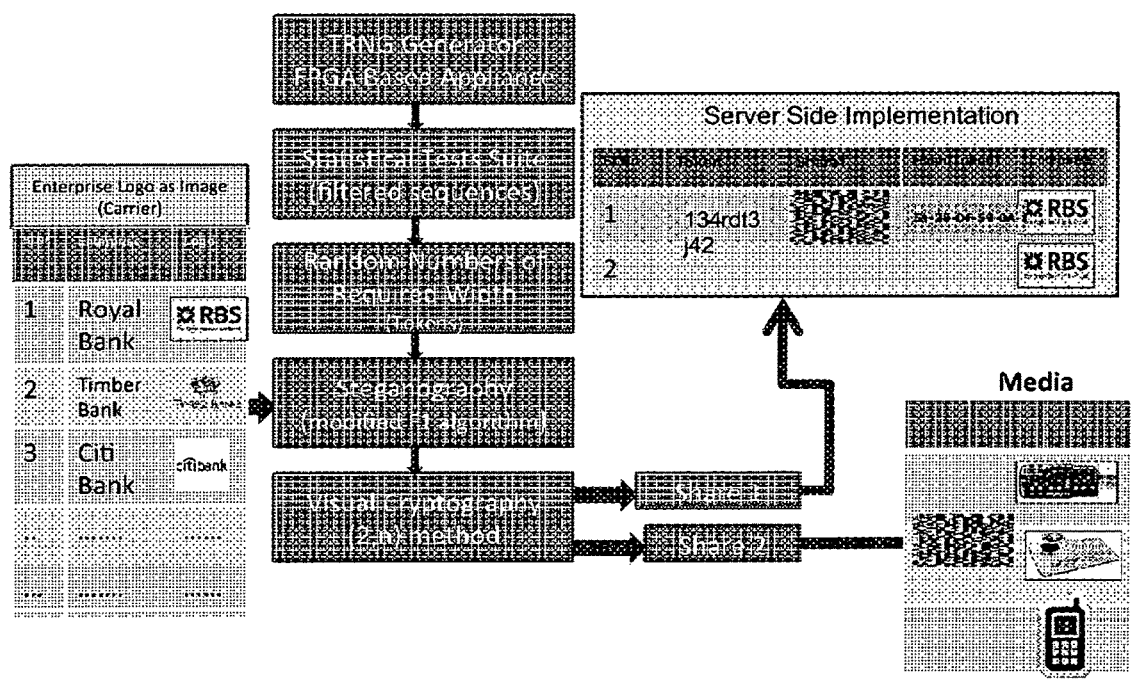
Figure 2:
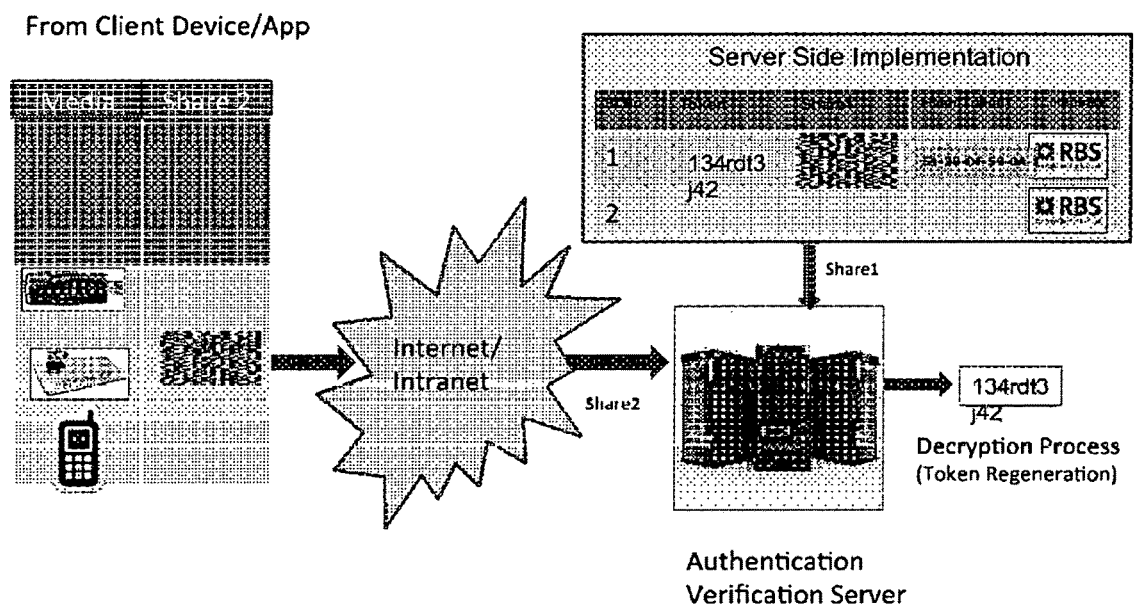
FIG. 2 illustrates the token shares decryption process according to the present invention.

The present patent application relates to an innovative use of Cryptographic tokens (keys) generated out of a hardware based True Random Number Generator, Statistical tests to weed out weak keys, number-to-image transformation, new steganographic methods of injecting into a Image carrier and splitting into shares using Visual Cryptographic methods and using it with a configured mobile application for real time product verification and seamless secured shopping. The present disclosure is not restrictive just for the whole process flow and also for the tokens generated thereupon for distribution in smartcard media or USB flash drives or in smart mobile applications and/or as computer program product. The total flow of work is depicted in FIG. 1 with illustrations.

The TRNG (True Random Number Generator) is implemented using FPGA based generator built with a Thermal Noise Generator. The hardware appliance generates continuous keys of required lengths. The keys generated are sieved through statistical tests and are orthogonal amongst the created are only good candidates are chosen as tokens or Keys.

In the TRNG (True Random Number Generator) based on Thermal noise circuit wherein the TRNG numbers are not generated at all Frequencies. Some Frequencies are not suitable for TRNG numbers generation. It may be appreciated that the following frequencies only generate good TRNG sequences (frequencies: 1 to 6 MHZ). Further the Von Neumann method is used to sample bits (sample two bits and discard them if they are equal. If they are not equal, then one of the bit is accumulated). The generated numbers if they don't undergo the Die-Hard Test suite, the appropriate frequency of generation is dropped. There is a closed loop link between generation process and statistical testing suite of Die-Hard to quantify the usable frequencies for TRNG number generation. This generation process is unique and yields good quality of TRNG sequences.

The Secret sharing is one type of key establishment protocols. The Trusted Authority (TA) divides the token or keys (secret) into pieces and distributes the pieces to different users. These pieces are called shares. Shares contain partial information about the secret. However, shares are constructed in such a way that although the secret can be reconstructed by combining a number of shares, simply examining individual user's share will not reveal the secret information at all.

Token shares are generated in-situ from the good candidate keys using Image transformation, steganography and Visual cryptographic algorithms. For every key generated a pair of share tokens is generated. At least a pair of share tokens is generated.

The tokens generated as described in aforesaid paragraph can be used as symmetric keys for certificate-less cryptographic applications. Certificate-less cryptography is a promising technology for solving the key escrow problem in identity-based cryptography.

One share token, the stegano content (Carrier and the TRNG key number) and the original cryptographic key can be at server level, including the procedures for reversing steganographic procedure, combining procedure for getting back the original number out of the two shares using Visual cryptography and verifying with original key.

The other share can be infused into the product as QR codes as per PKCS#11 standards of key distribution.

During verification of the keys at server level, two level authentications are carried out. At the first level when the reconstructed image of the two shares reveals the Stegano carrier Image and second, the original TRNG value getting reconstructed after dispensing the stegano carrier as referred to in FIG. 1.

Visual cryptography (M. Naor, A. Shamir: Visual Cryptology, Eurocrypt '94, Springer-Verlag LNCS Vola 950, Springer-Verlag, 1995, pp 1-12) can briefly be described as follows. An image is split into two randomized parts, the image plus a randomization and the randomization itself. Either part contains no information on the original image because of the randomization. However, when both parts are physically overlaid the original image is reconstructed.

If the two parts do not fit together, no information on the original image is revealed and a random image is produced. Therefore if two parties want to communicate using visual cryptography, they have to share the randomization. A basic implementation would be to give a receiving party a transparency containing the randomization. The sender would then use this randomization to randomize the original message, and transmit the randomized message to the receiver, on a transparency or any other means. The receiver puts the two transparencies on top of each other and recovers the message. This scheme can be compared to a OTP.

In the disclosed regeneration process from the shares the Image processing methods are used for the cleaning the salt and pepper noise after overlaying the shares, doing a raster to vectorization process to get back the ASCII value from the raster content, to reconstruct the token and compare with the original. This is done as the whole process is done programmatically and no human intervention for decision is needed.

Figure 3:
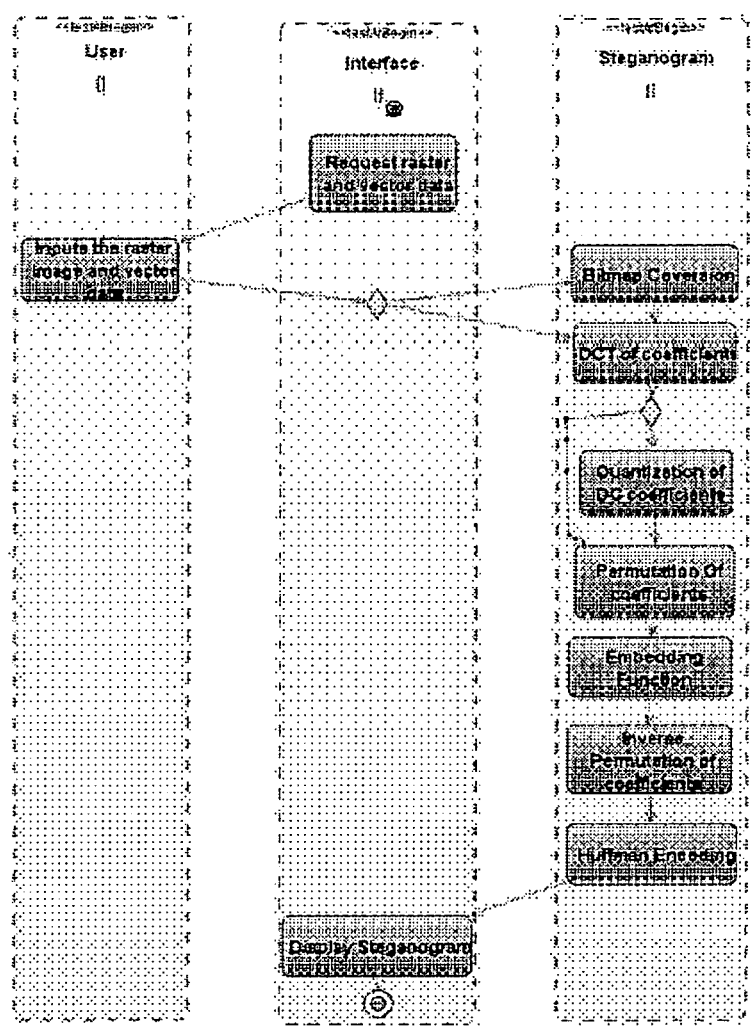
FIG. 3 illustrates the modified F5 algorithm in accordance with the present invention.

Modified F5 Algorithm Details for Stegnography:

The Token (Random Number Key) data as described in aforesaid paragraphs is the stego message that's needs to be embedded in the cover image (Implemented as Logo Images of Different Enterprises) i.e. the raster image before the activation of Visual cryptography algorithm is initiated. For this a modified F5 algorithm is used as shown in FIG. 3. The modified F5 algorithm is the most improved way of implementing steganographic processes for JPEG quality images.

The Enterprise Logo as Image is chosen as a carrier to embed the TRNG sequences within it using modified F5 algorithm. This process also is used as an authentication method strongly associating the enterprise. In the event of hacking or breach the step would only reveal the Logo of the enterprise rather than the associated TRNG Token within it.

The Logo with the embedded token is split using non-linear algorithm of splitting into two or more shares. Different Non-linear algorithms will result in different pairs of orthogonally different numbers of shares (2 or more depending on the splitting methods). This ensures reusability of the Logo with embedded tokens for multiple authentication processes. The shares generated are as equivalent to PKI certificates generated. No third party need to be involved is such shares (tokens) generation unlike in conventional certificate/Tokens/Key generation process.

There are two major extensions in this proposed algorithm from the published algorithm. They are:
Permutative Straddling
Matrix Encoding The objective is for practical embedding method for JPEG images that would provide high steganographic capacity without sacrificing security. Guided by the $\chi 2$ attack (chi square), this algorithm challenges the paradigm of replacing bits of information in the cover-image with the secret message while proposing a different paradigm of incrementing image components to embed message bits. Instead of replacing the LSBs of quantized DCT coefficients with the message bits, the absolute value of the coefficient is decreased by one. This type of embedding cannot be detected using their $\chi 2$ statistical attack.

The F5 algorithm embeds message bits into randomly-chosen DCT coefficients and employs matrix embedding that minimizes the necessary number of changes to embed a message of certain length. According to the modified F5 algorithm, the program accepts five inputs:
  Quality factor of the stego-image Q;
  Input file (TIFF, BMP, JPEG, or GIF);
  Output file name;
  File containing the secret message;
  User password to be used as a seed for PRNG;
  Comment to be inserted in the header.

In the embedding process, the message length and the number of non-zero non-DC coefficients are used to determine the best matrix embedding that minimizes the number of modifications of the cover-image. Matrix embedding has three parameters (c, n, k), where c is the number of changes per group of n coefficients, and k is the number of embedded bits. A simple matrix embedding (1, 2k−1, k) using a "hash" function that outputs k bits when applied to 2k−1 coefficients.

The embedding process starts with deriving a seed for a PRNG from the user password and generating a random walk through the DCT coefficients of the cover image. The PRNG is also used to encrypt the value k using a stream cipher and embed it in a regular manner together with the message length in the beginning of the message stream. The body of the message is embedded using matrix embedding, inserting k message bits into one group of 2k−1 coefficients by decrementing the absolute value of at most one coefficient from each group by one.

The embedding process consists of the following six steps:

1. Get the RGB representation of the input image.
   A color value is normally a three-component vector in a color space (a set of possible colors). A well known color space is RGB. Since the colors red, green, and blue are additive primaries, every color can be specified as a weighted sum of a red, green, and a blue component. A vector in RGB space describes the intensities of these components. Another space, known as YCbCr, distinguishes between a luminance (Y) and two chrominance (Cb,Cr) components. Whereas the Y component accounts for the brightness of a color, Cb and Cr distinguish between the color grades. A color vector in RGB can be converted to YCbCr using the transform:

$Y=0.299R+0.587G+0.114B$ $Cb=0.5+(B-Y)/2$ $Cr=0.5+(R-Y)/1.6$

2. Calculate the quantization table corresponding to quality factor Q and compress the image while storing the quantized DCT coefficients.
3. Compute the estimated capacity with no matrix embedding
4. C=hDCT−hDCT/64−h(0)−h(1)+0.49h(1),
   where hDCT is the number of all DCT coefficients, h(0) is the number of AC DCT coefficients equal to zero, h(1) is the number of AC DCT coefficients with absolute value 1, hDCT/64 is the number of DC coefficients, and −h(1)+0.49h(1)=−0.51h(1) is the estimated loss due to shrinkage (see Step 5). The parameter C and the message length together determine the best matrix embedding.
5. The user-specified password is used to generate a seed for a PRNG that determines the random walk for embedding the message bits. The PRNG is also used to generate a pseudo-random bit-stream that is XOR-ed with the message to make it a randomized bit stream. During the embedding, DC coefficients and coefficients equal to zero are skipped.

6. The message is divided into segments of k bits that are embedded into a group of 2k−1 coefficients along the random walk. If the hash of that group does not match the message bits, the absolute value of one of the coefficients in the group is decreased by one to obtain a match. If the coefficient becomes zero, the event is called shrinkage, and the same k message bits are re-embedded in the next group of DCT coefficients (note that LSB(d)=d mod 2, for d>0, and LSB(d)=1−d mod 2, for d<0).

7. If the message size fits the estimated capacity, the embedding proceeds, otherwise an error message showing the maximal possible length is displayed.

In order to provide seamless shopping experience to consumers using their mobile phones, whether they are shopping in-store, online, on TV or outdoor the above disclosed method of generating secure tokens and transmission based on (trng) generated tokens and split into shares is used. For such application of shopping at least two shares are generated, wherein one share resides mainly on the product meant for its verification for its genuineness in the form of QR codes and the other share resides in the server for the verification. In case of more shares, they can be used for various level of verification. For verification purposes the consumers would scan the QR (quick reader) code printed on the labels using a mobile application. Upon scanning the QR code, the application would immediately identify the product, the manufacturer and other such information. If the product is not genuine and fake or pirated good, an alert is immediately be sounded to the consumer. The consumer then can approach the store keeper for further verification if needed (send further verification mail from mobile or PC if shopping electronically). If the product is genuine, consumer has three choices—to buy, add to the shopping cart or add to personal shopping store for future decision. Upon chosing BUY, the consumer would be connected to a payment gateway (including any third party payment gateway) to process the purchase.

Upon the acceptance of payment, the application would immediately inform the store (retail store or online store) and the manufacturer about the successful purchase. If the consumer is shopping in a physical store, he can now walk out of the store, with the knowledge of having registered the purchase with the store system. When implemented in physical stores, this would help the consumer avoid payment queues (including automated payment queues now in place in most department stores in the US and Europe). The consumer now also can purchase goods advertised on OOH advertising (billboards, buses etc.) or TV shows, using QR codes displayed. It is the same, single application that can be used to shop anywhere.

As per an exemplary embodiment, the method is configured for helping the product manufacturer fight fake/pirated goods problem. The disclosed solution is the only effective way of addressing this problem, in a low cost manner. As the customer would immediately come to know if the product sold is not genuine, upon scanning the QR code on the goods, customer could immediately report the incident to the store or the manufacturer (physically, by phone or electronically). This would help customers to avoid fake goods at the time of purchase itself. The manufacturer would come to know of the fake goods incidence in real time, and can take action accordingly.

Another embodiment would help manufacturers to improve their customer relationship management and inventory/sales management. Using the said application, consumers can immediately register their product with the manufacturer in real time. The manufacturer would also come to know about sales in real time and therefore can plan his production and distribution effectively, resulting in cost savings and improved business. Manufacturers can also enhance their sales by converting Out Of Home advertisements and TV advertisements into sales. At present, there is direct way of converting impulses created by OOH or TV ads. Consumers can use the QR codes printed on these ads to immediately purchase goods.

Another embodiment of the present invention is to help retailers to cut costs and improve shopping experience. Since the present application facilitates Pay As You Shop and easy, self-checkouts, consumers can avoid queues and shop more. Retailers would also avoid installing expensive automated checkout machines or cashiers. The disclosed powerful goods authentication and shopping solution, uses QR codes, which are increasingly printed on various goods labels and in adverts all over the world. With application of the disclosed True Random Number Generator and the visual cryptography based image shares technology, we convert every QR code into two more QR code shares (up to four shares possible). One QR code share will be printed on the goods/service label, one QR code share will be sent to the retailer and one stays at the manufacturer server. When consumers scan the QR code share printed on the goods with their mobile phones, the mobile application is configured for automatically sending the QR code share to the manufacturer and retail servers to check for authenticity. The three shares are merged back using our proprietary algorithm disclosed above to create back the original QR code, which is present at the manufacturer server. Once the manufacturer server authenticates, consumer would proceed to purchase the goods, as described earlier.

The fast indexing algorithm makes the whole scanning and checking experience simple and quick. The basis of unique QR codes and QR code shares is our TRNG. Random numbers from TRNG, used in making QR codes, are highly unique, resulting in higher security. The solution also enables commerce based on electronic signatures, based on mobile identifier parameters (such as IMEI, IMSI), visual cryptographic shares, hash value and QR codes. Offline authentication methods, combining (n,r) visual cryptographic schemas and QR codes is possible. Using the visual cryptographic technology, it is possible to check the identity accessing to the QR codes and to control permission to the protected data.

Currently, a number of providers and companies are looking to implement various NFC (near field communication) based payment and digital wallet systems around the world. The QR code based authentication and shopping system is cheaper, easier and more secure way of achieving digital commerce. By tying up with payment gateways and banks, our solution will offer significantly more secure digital wallet offering. In NFC, data need to travel between mobile phone and payment terminal of retailer. Malicious agents moving around in the shop area can easily catch such data transfer. In our solution, payment happens on the mobile itself. Since all our data is encrypted using visual cryptography, risks are lowered significantly. Retailers also need not add expensive NFC hardware to their existing payment terminals.

The steps followed for the QR login is as under:
1. In the first step the consumer/user registers with website and gets his/her exclusive login credentials.
2. The user logged in with registered credentials.
3. The user click on "Add Device"
   a. QR code gets displayed on browser
   b. Scan the QR
   c. Mobile browser/app store will download the app.
4. Installs the mobile application
5. First Login:
   a. Enter the username and password in mobile (website credentials, one time)
   b. Once the credentials are accepted, choose a PIN for further mobile authentication
   c. Now mobile unique ID gets added to list of devices for the user account
6. Second login onwards
   a. user enters the credentials in the browser, it then displays a QR code
   b. Scan the QR code and enter the mobile application PIN
   c. If the QR and PIN are valid, then it shows the user login page in browser.

Note: website can be a bank website, financial website, e-shopping website or any kind of website As per another embodiment, the following is the QR Shop payment transaction sequence.
1. The QR login process can be integrated here
2. User stores his/her Debit/Credit card details in the secured mobile wallet
3. User scans the product, the basic product information gets displayed
4. Along with the product information, user can view the SCM (Supply Chain Management) scan label.
5. This scan label gives more information about the product like "Duplicate Product", "Not scanned at Distributor" etc.
6. Once user wishes to "Add to Wish-list", "Add to Cart" or "Buy", click the corresponding button.
7. At the time of confirming the order and when choose payment, the following steps will come into picture
8. It automatically re-directs to corresponding payment gateway and now the server will communicate and authenticate both the user and Payment Gateway (PG)
9. Server Authentication:
   a. Generates 3 shares.
   b. Share1 will be with server only
   c. Share2 will be displayed on the browser as QR for authenticating the user
   d. It receives QR data and other user details from user to validate the user
   e. Once user validated, Server sends User to send the Share2 to PG
   f. Server will send Share3 to PG (Payment Gateway)
10. User Authentication:
    a. A QR code gets displayed
    b. Scan the QR and enter the PIN (It sends QR Data, registered username and other relevant info to Server)
    c. User gets confirmation call to send Share2 to PG
    d. Once confirmation call comes, then it sends the QR code data to PG (Payment Gateway)
    e. User sends the bank login/card details to PG after getting request payment details from PG (Payment Gateway)
11. Payment Gateway (PG) Authentication:
    a. PG receives Share3 from server
    b. Receives Share2 from user
    c. PG then combines the 2 shares validates the server and the user
    d. After validation call, it gets the user payment details and bank login/card details for further processing
    e. Once the transaction is successful, PG communicates with the user with a valid transaction receipt.
12. Then the sold items status gets changed in the "Supply-Chain Management"

Note: Merchant is not involved in this sequence, because every 2 or 3 days, PG will send the all relevant transaction amount to merchant.

For the purposes of explanation and elaboration specific examples of authentic and secure shopping solution using mobile phones is disclosed.

A consumer walks into a super store. She picks up a push cart available at the store and proceeds to do shopping. She picks up various goods from the store shelves into this push cart. While standing at an aisle selling hair care products, she becomes curious about a new anti-dandruff shampoo. She launches the mobile application on her smart phone. Using the application, she scans the QR code printed on the shampoo pack. The QR code read by the mobile application displays information about the product on her mobile phone—information about the new shampoo, its key features, pricing, its advantages over existing shampoo products etc. It also has a link to the manufacturer web site as well as a video about the product. She decides to learn more about the product and compare it with other products and pricing before making a purchase decision, but at more leisure. She pushes the QR picked up to her personalized WISHLIST web store.

She then moves to the aisle containing alcoholic beverages. She intends to buy a well known champagne brand, which is her favorite. But she would like to ensure it is authenticity. She scans the QR code printed on the champagne bottle, using the mobile application. The application immediately confirms if the product is not genuine (not manufactured by the original manufacturer or his licensed franchisees, if any). If the product is genuine, she has options to either add to the WISHLIST or to PURCHASE. Since she would like to purchase the champagne bottle, she presses the BUY button on the phone (or adds to the CART if she has more goods to pick up before paying). Upon pressing the BUY option, she will be presented with a cart of payment options (already pre-registered by herself on her phone digital wallet). The consumer then chooses one of the payment options, enters the necessary PIN (and/or other payment authorization mechanisms mandated by the payment gateway, such as the three digit number on the back of the card etc.). Once the payment gateway authorizes the payment, the good is considered sold, and both the manufacturer and retailer (shop/superstore) servers are intimated immediately. She purchases other goods (individually or through cart) in similar fashion. When done, she walks out of the store, without having to queue at any till. Both the manufacturer and retailer would immediately register the sale and the manufacturer can plan his sales and inventory management in real time.

All the digital wallet information stored on the consumer's phone is secured by the Applicant's visual cryptographic encryption technology.

The said consumer, after picking up the goods, walks back to the train station to pick a train back home. At the train station, she sees an advertisement about new fashion clothing line from a fashion store. She would like try the clothing at home, before deciding to purchase. She also would like to surf at home in detail on her laptop. She scans the secure QR image printed on the advertisement with the mobile application and adds to the WISHLIST. While inside the train, she sees advertisement for a Hollywood blockbuster. She would like to watch the move tonight with her friends. She scans the secure QR code printed on the movie ad, which redirects her to the secure ticketing store. She makes the ticket purchase.

That evening, the consumer opens the laptop, and logs into her wish list store. She goes through all the wishes picked up while window-shopping, compares prices and goes through additional marketing information provided by the manufacturer. In this manner, she is able to securely store all the window shopping experience she had recently on her personalized web shopping store, for later reviews and purchases.

While working on her laptop, the consumer's TV was on. Her attention was drawn to an advertisement on a new variety of potato crisps. She wanted to try these crisps. She captured the secure QR code displayed on the TV during the advertisement, using the disclosed mobile application. The application, after recognizing the QR code, redirected her to the manufacturer site, where she could order a pack of the mentioned crisps for home delivery.

While working on the laptop, the consumer herein realized that her electricity bill payment if up for payment. She logged onto her utility web page, captured the QR code using the mobile application. The application, upon capturing the QR code, redirected her to the mobile payment gateway to complete the payment. Once the payment was completed, the application updated the Utility server about the payment.

In each the of the shopping and payment instances, the secure OR codes displayed on the product or in the advertisements were distinctly unique in nature, backed by true random numbers and visual cryptographic technology.

Web Based Authentication Using Smart Phone

Assumptions:

1) The smart phone has been registered to the particular website using the IMEI and IMSI
2) The smart phone has the legal and customized software that scans the QR code
3) The smart phone has the GPRS/Wifi connectivity so that the data can be sent using OOB (Out of band) channel.

The steps for the authentic transaction in secure shopping are described below.

Flow of Second Level Authentication:

Step 1:

The client machine sends a request to the server. Example the client machine requests for www.xxxx.com Step 2:

The server when it receives the request from a client will first authenticate the client. For this, it generates a random number. This TRNG is split into two shares SH1, SH2. The SH1 and TRNG is saved at a location and a pointer to that location is stored in A. The SH2 along with the URL (www.xxxx.com) and A is embedded into the QR code and sent to the client machine and the timer will be set.

Step 3:

Once the QR code is received the user will use his smart phone which is already registered with the server and has its own customized software to scan this QR code. The user will have registered his smart phone using the IMEI and IMSI number which is unique to the device. This will authenticate the smart phone. Also a 4 digit PIN number is used so that the user can authenticate the person. Only then will the legal customized software scan the QR code. The SH2, URL and the pointer A is obtained from this QR code.

Step 4:

The SH2, URL and pointer A is then sent to the server through out of band (OOB) channel. The device IMEI and IMSI numbers are also sent to the server. If this message has come within the time period the server checks the IMEI, IMSI number stored in the registry to authenticate that this message has come from the user himself. The server thus has authenticated that the message has come from the user himself.

Next, the value at the pointer A is retrieved. The shares SH1 and SH2 are overlaid. Only if this matches the TRNG stored, the authentication is complete.

Now the client and server machine can communicate securely using the SH2 as the key and any algorithm like AES etc. This way no third party key generators need to be used.

The Live Sequence Charts for the purposes of authentication and further transaction are described below.

Live Sequence Charts

The Man in the Middle Attacks is avoided using this procedure.

a) In case the Man in Middle (M) gets the QR code, he will not have the legal customized software to scan the QR code. His smart phone will not be registered with the server.
b) Even if any person gets hold of the smart phone the 4 digit PIN number will not been known to him and the authentication will not be complete.
c) This way secure communications between the user and server can take place using the QR code and Visual cryptography techniques.

Innovation (a) Existing digital certificate validation methods and PKI (public key private key) methods are asymmetric in nature and private keys used by users are generated based on root keys (usually held at the provider of PKI solutions to users). Same is the case with digital certificates, where root certificate data is stored on certificate provider database. When the databases of these providers are breached (as has been in several cases recently), the sanctity and integrity of the private keys or certificates is questionable. With the disclosed symmetric key architecture, outlined earlier, there is no root key or certificate held on third party or provider databases, resulting in higher integrity.

(b) Herein disclosed share keys are in an image form, unlike the regular ASCII form as is the case with most existing key solutions. This results in enhanced security and integrity (c) Easier to implement: The implementation of the cryptography is completely at the user control. No third party or vendor required for continuous usage of this solution.

(d) Random number sanctity: A True Random Number Generator is used to generate the base random numbers, which are true numbers in nature, unlike pseudo random numbers.

(e) Throughput: The disclosed TRNG could produce significantly large number of orthogonally different keys (0.5 million every 15 minutes), which is significantly better compared to alternatives such as PKI.

(f) The complete process of steps involving TRNG generation, embedding enterprise logo with TRNG numbers, splitting into shares using non-linear algorithms of Visual Cryptographic process and system based verification process is unique.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited, to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

Numerous modifications may be made to the present invention, which still fall within the intended scope hereof. Thus, it should be apparent that there has been provided in accordance with the present invention a method and apparatus for welding with a robotic system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Abbreviations Used

1. PKI Public Key Infrastructure
2. TRNG True Random Number Generator
3. PRNG Pseudo Random Number Generator
4. KGA Key Generation Algorithm
5. USB Universal Serial Bus
6. PKCS#11 Public-Key. Cryptographic Standards—Hardware Implementation
7. DCT Discrete Cosine Transform
8. RGB Colors—Red Green Blue
9. ASCII American Standard Code for Information Interchange
10. FPGA Field Programmable Gate Arrays
11. JPEG Joint Photographic Experts Group
12. LSB Least Significant Bits
13. OTP One Time Password
14. TIFF Tagged Image File Format
15. BMP Bitmap Image File
16. GIF Graphics Interchange Format
17. DSS Data Security Standards
18: QR code—Quick Reader code

The invention claimed is:

1. A method of generating secure tokens and transmission based on (TRNG) generated tokens and split into shares, the method comprising steps of:
    generating keys by a hardware based True Random number Generator (TRNG);
    sieving/filtering the generated keys using statistical tests suite and are orthogonal amongst the created; selecting random numbers of required width as tokens;
    applying number to image transformation for the said tokens;
    applying steganography methods of injecting into image carrier to the selected tokens; and
    splitting the steganographic contents into at least two shares using Share Generation Appliance (SGA), which is based on visual cryptographic methods using a non-linear algorithm whereby the at least two shares and the non-linear algorithm are required to recreate the selected tokens; wherein, one share token, a stegano content (Carrier and the TRNG key number) and an original cryptographic key is stored at server level, including the procedures for reversing steganographic procedure, combining procedure for getting back the original number out of the two shares using Visual cryptography and verifying with original key and the second share token, is stored into media like Smart cards, USB flash drives, with or without biometric fingerprint scanner or any other media as per PKCS#11 standards of key distribution;
    pasting one of the shares on a product as a QR code; and storing another of the shares in a verification server, wherein verification of the one and another shares is carried out in the verification server with a reconstructed image of the one and another shares revealing the image carrier and the TRNG key therein.

2. The method as claimed in claim 1, wherein the key generation appliance is based on FPGA based generator build with a Thermal noise generator with frequencies preferably 1 to 6 MHZ.

3. The method as claimed in claim 1, wherein Von Neumann method is applied to generated keys which include discarding them under condition that the two sample (keys) bits are equal and accumulating one of the bits (keys) if they are not equal.

4. The method as claimed in claim 1, wherein the generated numbers (keys) under condition that they don't undergo the Die-Hard Test suite then the appropriate frequency of generation is dropped.

5. The method as claimed in claim 1, wherein there is a closed loop link between generation process and statistical testing suite of Die-Hard to quantify the usable frequencies for TRNG number generation.

6. The method as claimed in claim 1, wherein the splitting of the shares contains partial information about the secret.

7. The method as claimed in claim 1, wherein for every key, a pair of share tokens is created.

8. The method as claimed in claim 1, further comprising the step of verifying the keys at the server level.

9. The method as claimed in claim 8, wherein, during verification of the keys at server level, two level authentication is carried out wherein at the first level when the reconstructed image of the two shares reveals the Stegano carrier Image and second, the original TRNG value gets reconstructed after dispensing the stegano carrier.

10. The method as claimed in claim 8 wherein the shares generated are as equivalent to PKI certificates generated and no third party required to be involved is such shares (tokens) generation unlike in conventional certificate/Tokens/Key generation process.

11. The method as claimed in claim 8, wherein in the verification process from the shares the Image processing methods are applied for cleaning the salt and pepper noise after overlaying the shares and doing a raster to vectorization process to get back the ASCII value from the raster content, to reconstruct the token and compare with the original.

12. The method as claimed in claim 1, wherein, the either shares contains no full information on the original image because of the randomization and the original image is revealed under condition that the shares gets physically overlaid and are fit together.

13. The method as claimed in claim 12, wherein, under condition that either share do not fit together, then no information on the original image is revealed and a random image is produced.

14. The method as claimed in claim 1, wherein, the share token is a stego message and is embedded in the cover image (implemented as Logo Images of Different Enterprises) before the activation of Visual cryptography algorithm is initiated using a modified F5 algorithm.

15. The method as claimed in claim 14, wherein any event of hacking or breach would only reveal the Logo of the enterprise rather than the associated TRNG Token within it.

16. The method as claimed in claim 14, wherein the Logo with the embedded token is split using non-linear algorithm of splitting into two or more shares and the different Non-linear algorithms results in different pairs of orthogonally different numbers of shares (two or more depending on the splitting methods).

17. The method as claimed in claim 1 further comprising the steps of: registering a consumer/user with a website for receiving exclusive login credentials and mobile application software; logging into the website by the consumer/user with a user mobile device using the exclusive login credentials; adding the user mobile device to the website; and installing the mobile application software from the website in the user mobile device.

18. The method as claimed in claim 17 further comprising the steps of:
entering a username and a password in the user mobile device as the exclusive login credentials;
choosing a PIN for further mobile authentication, once the exclusive login credentials are accepted by the website; and
adding the PIN as a unique ID to a list of devices in the website for the consumer/user.

19. The method as claimed in claim 18 further comprising the steps of:
entering by the consumer/user the exclusive login credentials in a browser running on the user mobile device to display the QR code;
scanning the QR code and entering the PIN; and
if the QR and the PIN are valid, then a user login page is displayed in the browser.

20. The method as claimed in claim 17 wherein the website can be one of a bank website, a financial website, and an e-shopping website.

21. The method as claimed in claim 17 further including re-directing from the website to a payment gateway for payment transactions to be carried out by splitting the steganographic contents into three shares using the Share Generation Appliance ((SGA), which is based on visual cryptographic methods using a non-linear algorithm.

22. The method as claimed in claim 21 wherein a valid payment transaction is done with server authentication, user authentication and Payment Gateway (PG) Authentication.

23. A method of generating secure tokens and transmission based on (TRNG) generated tokens split into shares, the method comprising steps of:
generating keys by a hardware based True Random Number Generator (TRNG);
sieving/filtering the generated keys using statistical tests suite to create orthogonally different keys;
selecting the orthogonally different keys having a required width as tokens;
applying number to image transformation to the tokens;
applying steganography methods to inject the selected tokens into an image carrier;
splitting the image carrier with the steganographic contents into at least two shares using a Share Generation Appliance (SGA), which is based on visual cryptographic methods;
wherein, an F5 algorithm embeds message bits into randomly-chosen DCT coefficients and employs matrix embedding that minimizes the necessary number of changes to embed a message of certain length including inputs as:
Quality factor of the stego-image Q;
Input file (TIFF, BMP, JPEG, or GIF);
Output file name;
File containing the secret message;
User password to be used as a seed for PRNG;
Comment to be inserted in the header.

24. The method as claimed in claim 23, wherein, the matrix embedding has three parameters (c, n, k), where 6 is the number of changes per group of n coefficients; and k is the number of embedded bits including simple matrix embedding (1, 2k−1, k) using a "hash" function that outputs k bits when applied to 2k−1 coefficients.

25. The method as claimed in claim 24, wherein, the embedding process includes the steps of:

selecting an RGB representation of the input image;
calculating the quantization table corresponding to quality factor Q and;
compressing the image while storing the quantized DCT coefficients;
computing the estimated capacity with no matrix embedding;
generating a seed for a PRNG using a user-specified password that determines the random walk for embedding the message bits; wherein the message is divided into segments of k bits that are embedded into a group of 2k−1 coefficients along the random walk and under condition that the hash of that group does not match the message bits, the absolute value of one of the coefficients in the group is decreased by one to obtain a match and if the coefficient becomes zero, the same k message bits are re-embedded in the next group of DCT coefficients (LSB(d)=d mod 2, for d>0, and LSB(d)=1−d mod 2, for d<0) and further if the message size fits the estimated capacity, the embedding proceeds, otherwise an error message showing the maximal possible length is displayed.

26. The method as claimed in claim 25, wherein the step of computing is carried out with following equation:

$$C = hDCT - hDCT/64 - h(0) - h(1) + 0.49h(1),$$

where hDCT is the number of all DCT coefficients, h(0) is the number of AC DCT coefficients equal to zero, h(1) is the number of AC DCT coefficients with absolute value 1, hDCT/64 is the number of DC coefficients, and −h(1)+0.49h(1)=−0.51h(1) is the estimated loss due to shrinkage and the parameter C and the message length together determine the best matrix embedding.

27. The method as claimed in claim 25, wherein the PRNG also generates a pseudo random bit-stream that is XOR-ed with the message to make it a randomized bit stream.

28. The method as claimed in claim 25, wherein during the process of embedding, DC coefficients and coefficients equal to zero are skipped.

29. A system of generating secure tokens and transmission thereof based on (TRNG) generated tokens split into shares, the system comprising:
a hardware based True Random number Generator (TRNG) generating keys; and
a non-transitory computer-readable medium comprising instructions stored thereon, that when executed on a processor, perform the steps of:
sieving/filtering the generated keys with a statistical tests suite to create orthogonally different keys;
selecting the orthogonally different keys having a required width as tokens;
applying number to image transformation to the tokens;
applying steganography methods to inject the selected tokens into an image carrier;
splitting the image carrier with the steganographic contents into at least two shares using Share Generation Appliance (SGA), which is based on visual cryptographic methods using a non-linear algorithm whereby the at least two shares and the non-linear algorithm are required to recreate the selected tokens;
wherein, one token share, stegano content and an original cryptographic key are stored at a server level, the instructions, including procedures for reversing the steganography methods, a combining procedure for getting back the original number out of two shares using Visual cryptography and verifying with the original key and an associated second token share, are stored into media including Smart cards, USB flash drives, with or without biometric fingerprint scanner or any other media as per PKCS#11 standards of key distribution; and
including a verification server, wherein when one of the shares is applied to a product as a QR code and another of the shares is stored in the verification server, verification of the one and another shares is carried out at the verification server level with a reconstructed image of the one and another shares revealing the image carrier and the TRNG key therein.

30. The system as claimed in claim 29, wherein the key generation hardware is an FPGA based generator built with a Thermal noise generator with frequencies preferably 1 to 6 MHZ.

31. The system as claimed in claim 29, wherein the shares are at least equivalent to generated PKI certificates and no third party is required to be involved in the shares generation unlike in a conventional certificate/Tokens/Key generation process.

32. The system as claimed in claim 29, wherein in an event of hacking or breach only a Logo of an enterprise is revealed rather than the TRNG token within the image carrier.

33. The system as claimed in claim 29, the instructions further comprising verifying the keys at a server level.

34. The system as claimed in claim 29, wherein the one and another shares generated are as equivalent to PKI certificates generated and no third party required to be involved is such shares (tokens) generation unlike in conventional certificate/Tokens/Key generation process.

35. The system as claimed in claim 29, wherein any event of hacking or breach would only reveal the image carrier rather than the associated TRNG token within it.

* * * * *